United States Patent [19]

Arens

[11] Patent Number: 5,466,207
[45] Date of Patent: Nov. 14, 1995

[54] DIE CHANGE APPARATUS FOR RECIPROCATING PRESS

[76] Inventor: Cornelus G. Arens, 9001 Hubbell St., Detroit, Mich. 48228

[21] Appl. No.: 169,208

[22] Filed: Dec. 20, 1993

[51] Int. Cl.⁶ .................................................. B23Q 3/155
[52] U.S. Cl. .................. 483/28; 72/442; 83/563; 100/229 R; 100/918
[58] Field of Search .................. 483/28, 29; 100/229 R, 100/918; 72/442, 446; 83/563, 559

[56] References Cited

U.S. PATENT DOCUMENTS

| 3,738,284 | 6/1973 | Atsutahl | 100/918 X |
| 3,862,565 | 1/1975 | Smit | 100/229 R |
| 4,152,978 | 5/1979 | Abe et al. | 72/446 X |
| 4,503,741 | 3/1985 | Hunter | 72/442 X |
| 5,040,404 | 8/1991 | Henderson et al. | 72/446 |

FOREIGN PATENT DOCUMENTS

| 1101910 | 3/1961 | Germany | 483/29 |
| 3933736 | 6/1990 | Germany | 483/28 |
| 19670 | 6/1972 | Japan | 100/918 |
| 1530318 | 12/1989 | U.S.S.R. | 483/29 |
| 9100784 | 1/1991 | WIPO | 483/29 |

*Primary Examiner*—William Briggs

[57] ABSTRACT

A set of laterally extending rails which facilitate translation of a die into a die opening of a reciprocating cutoff press from a storage area and vice-a-versa. A first set of rails are secured to the longitudinally reciprocable press carriage; and, a second set of rails extend laterally therefrom to function as a storage platform. A rack and pinion system is used to accomplish translation of a die from a storage area into the press opening. In addition, a cylinder is extended so as to index a follower along a cam profile which elevates the follower to facilitate engagement with the die assembly to further translate the assembly into final position in the press opening.

8 Claims, 3 Drawing Sheets

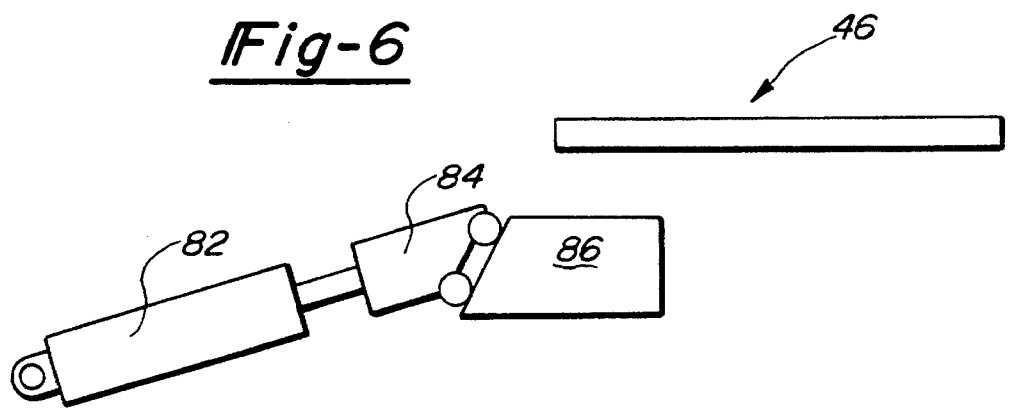
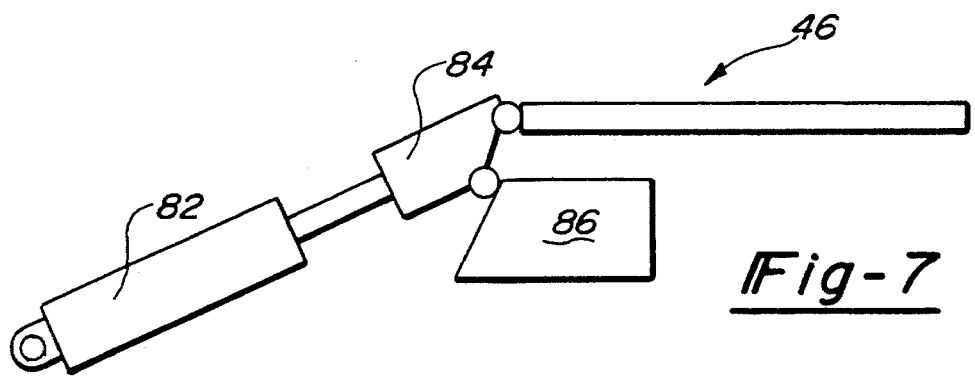
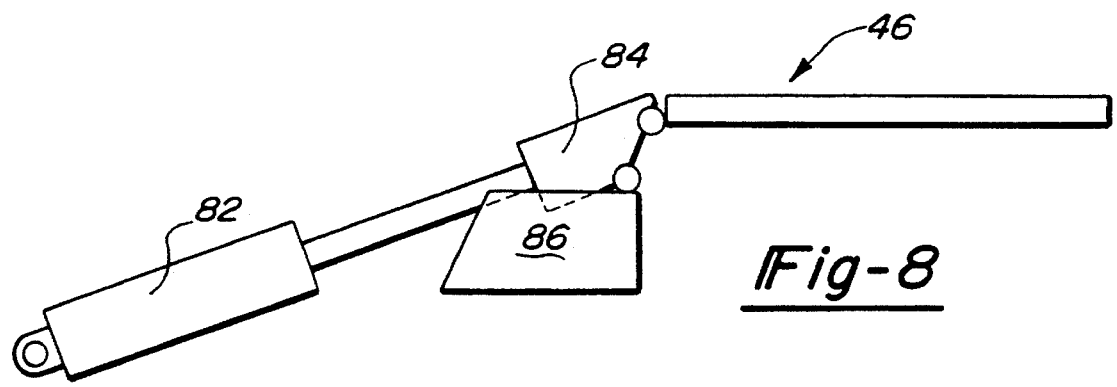

DIE CHANGE APPARATUS FOR RECIPROCATING PRESS

BACKGROUND OF THE INVENTION

1. FIELD OF THE INVENTION

This invention relates to mechanisms for accomplishing die changes in reciprocating presses and, more particularly, relates to die changes of reciprocating presses which may be accomplished by motive forces incorporated in the die change mechanism.

2. DESCRIPTION OF THE PRIOR ART

Presently to accomplish a die change in a reciprocating press requires removal of all guarding devices and positioning of a horizontal platform to effect an extension of the bottom surface of the reciprocating press. The die is drawn forward from the press opening onto the platform whereupon it may be removed therefrom by a fork truck or an overhead crane. Such an operation requires substantial down time of the reciprocating press to accomplish the removal and installation procedures. Therefore, there is a need in the art for a quick change die system which does not require removal of the guarding devises and positioning of a horizontal platform and may be accomplished in a minimum of time.

SUMMARY OF THE PRESENT INVENTION

A set of laterally extending rails which facilitate translation of a die into a die opening of a reciprocating cutoff press from a storage area and vice-a-versa. A first set of rails are secured to the longitudinally reciprocable press carriage; and, a second set of rails extend laterally therefrom to function as a storage platform. A rack and pinion system is used to accomplish translation of the die from the storage area into the press opening. In addition, a cylinder is extended so as to index a follower along a cam profile which elevates the follower to facilitate engagement with the die assembly to further translate the assembly into final position in the press opening. A first actuator is used to index a first pin into a first opening in the horizontally reciprocal press carriage to maintain alignment of the first and second rails. The die is laterally retained in position in the die opening by a second actuator which indexes a second pin into a second opening on the die itself. In this manner a die may be laterally translated from a storage position into the die opening without requiring removal of guarding devices.

These and other aspects of the present invention will become more readily apparent by reference to the following detailed description of the embodiments as shown in the drawings.

BRIEF DESCRIPTION OF THE DRAWINGS

FIG. 6 is a schematic representation of a cylinder driving a cam follower against a cam profile to facilitate translation of a die assembly in a reciprocating press incorporating the present invention;

FIG. 7 is a schematic representation of a cylinder engaging a die assembly and initiating translation thereof; and FIG. 8 is a schematic representation of a cylinder having translated a die assembly to an installed position in a reciprocating press incorporating the present invention.

DETAILED DESCRIPTION OF THE PREFERRED EMBODIMENT

Figure 1:
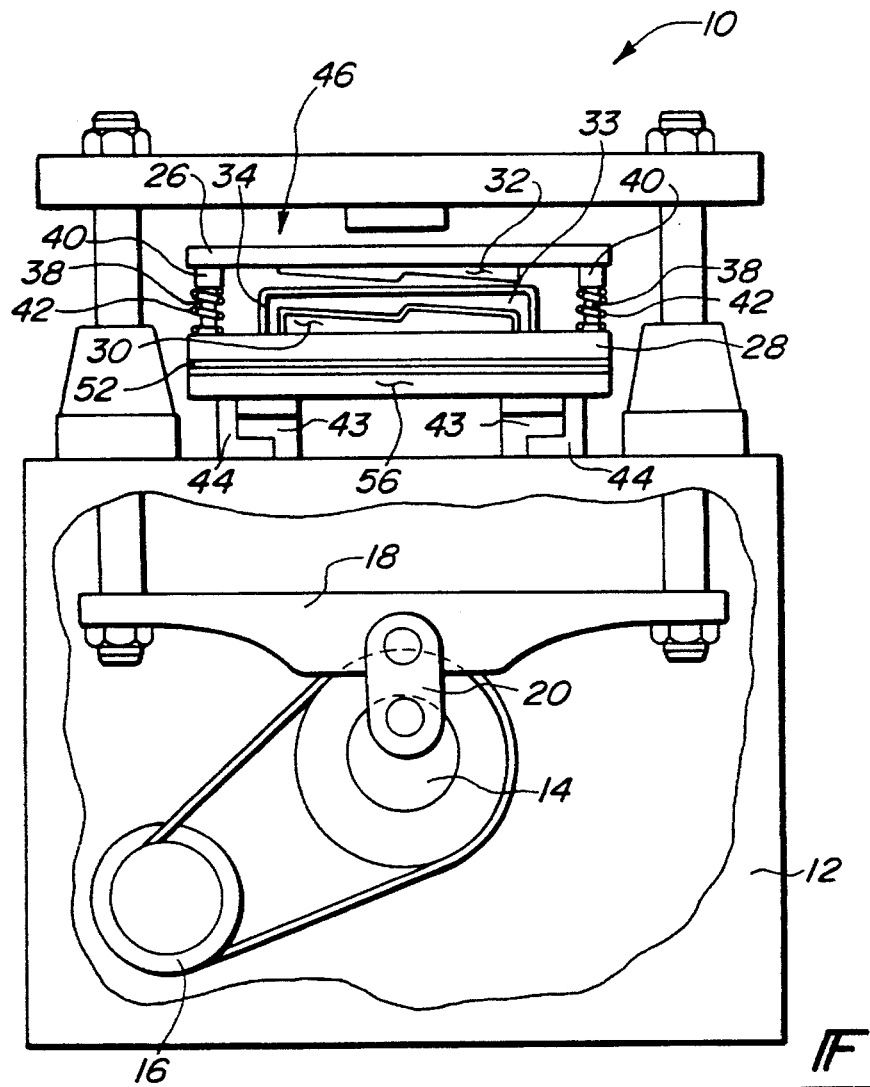
FIG. 1 is a front view of a reciprocating press which may be adapted to receive the present invention.

The present invention as illustrated in FIG. 1 includes a reciprocating press 10 featuring a frame 12 which supports eccentric 14 for rotation. Motor 16 drives eccentric 14 through a flywheel-clutch-brake assembly (not shown). Platen 18 is caused to reciprocate in response to forces transmitted from eccentric 14 through connecting link 20. Draw bars 22, 22 cause ram 24 to strike upper die shoe 26 causing interacting members 30, 32 to cut a workpiece 33 placed therebetween. Stripper 34 acts to remove the workpiece from the surface of member 32. Guide posts 38, 38 secured to lower die shoe 28 are supported for reciprocation by guide bushings 40, 40. Springs 42, 42 return upper die shoe 26 upon completion of a cycle. Interacting sliding rails 43, 44 facilitate horizontal translation of the die assembly 46 during reciprocation of upper die 26 so as to synchronize horizontal translation of the interacting members 30, 32 with a workpiece passing therethrough. The mechanism to facilitate translation of the die assembly 46 may be an air cylinder (not shown).

Figure 2:
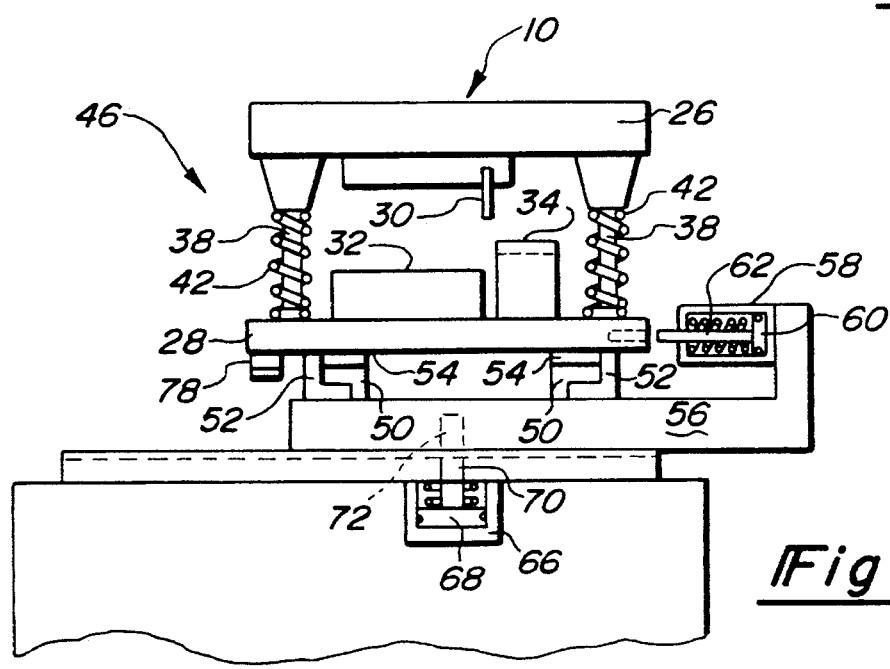
FIG. 2 is a side view of a reciprocating press adapted to receive the present invention.
Figure 3:
FIG. 3 is a front view of the positions which a die assembly may be placed on a reciprocating press incorporating the present invention.
Figure 5:
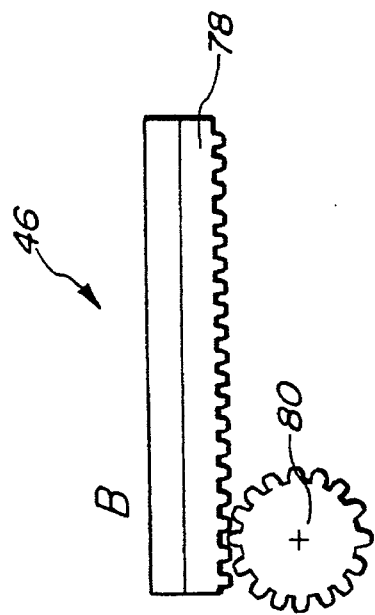
FIG. 5 is a schematic representation of the rack and pinion translation technique used to install a die assembly in a reciprocating press incorporating the present invention.
Figure 4:
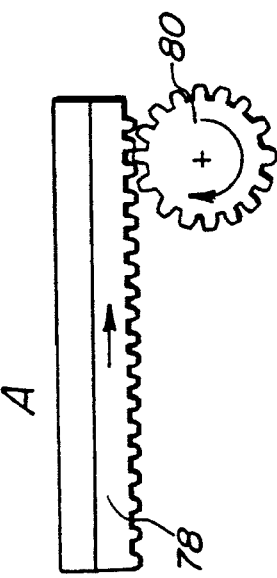
FIG. 4 is a schematic representation of the rack and pinion translation technique used to install a die assembly in a reciprocating press incorporating the present invention.

FIG. 2 is a side view of a portion of a reciprocating press 10 including lateral interacting sliding rails 50, 52 and bearing surface 54, 54. Longitudinal reciprocating carriage 56 carries detent cylinder 58 including piston 60 which may translate detent rod 62 upon being properly charged with compressed air. Detent rod 62 is telescopically received in aperture 64 for securing lateral translation of die assembly 46 for production operations. Detent cylinder 66 includes piston 68 which may translate detent rod 70 upon being properly charged with compressed air. Detent rod 70 is telescopically received in aperture 72 for securing longitudinal translation of longitudinal reciprocating carriage 56. Lateral interacting sliding rails 50, 50 extend on both sides of press 10, as shown in FIG. 3, to define die assembly 46 storage and retrieval locations 74, 76. Rack 78 disposed on lower die shoe 28 is driven by pinion 80 from a first position A to an interim installed position B, as shown in FIGS. 4 and 5. Thereupon cylinder 82, as shown in FIG. 6, is charged causing cam follower 84 to proceed up the face of cam 86 into engagement with die assembly 46 and translating same to installed position C, shown in FIG. 8. Additional extension of cylinder 82 may be utilized to engage rack 78 with a pinion located on the opposing side of press 10 to translate die assembly 46 on to storage/retrieval location 76.

One skilled in the art will readily recognize that certain specific details shown in the foregoing specification and drawings are exemplary in nature and subject to modification without departing from the teachings of the disclosure. Various modifications of the invention discussed in the foregoing description will become apparent to those skilled in the art. All such variations that basically rely on the teachings through which the invention has advanced the art are properly considered within the spirit and scope of the

I claim:

1. A reciprocating press for cutting a workpiece placed therein including a reciprocable carriage movable in a longitudinal direction wherein the invention comprises:

a first pair of laterally oriented rails aligned transverse to said longitudinal direction disposed on said carriage and engageable with a second pair of cooperating rails disposed on a lower die shoe of a die assembly permitting translation thereof;

a third pair of laterally oriented rails extending from at least one side of said carriage and alignable with said first pair;

means for maintaining a first position of said reciprocable carriage in which said first and said third pair of rails are aligned; and means for maintaining a second position of said die assembly translated to a predetermined lateral position.

2. The invention of claim 1 further comprising means for laterally translating said die assembly from a storage position to said predetermined lateral position.

3. The invention of claim 1 wherein said means for maintaining said first position of said carriage is a rod disposed on said press and reciprocable with respect thereto engaging an aperture defined in said carriage.

4. The invention of claim 1 wherein said means for maintaining said second position of said die assembly is a rod disposed on said carriage and reciprocable with respect thereto engaging an aperture defined in said die assembly.

5. The invention of claim 2 wherein said means for translating said die assembly is a pinion rotatably maintained on said press drivingly engageable with a rack disposed on said die assembly.

6. The invention of claim 2 wherein said means for translating said die assembly comprises a fluid actuated cylinder which displaces a cam follower along a cam profile upon displacement thereof such that said cam follower is elevated into contact with said die assembly and laterally translated upon additional displacement of said cylinder.

7. The invention of claim 2 wherein said means for translating said die assembly is a pinion rotatably maintained on said press and drivingly engaging a rack disposed on said die assembly for displacing said die assembly to a first position and a fluid actuated cylinder which may be displaced to cause a cam follower to be respectively displaced along a cam profile upon displacement thereof such that said cam follower is elevated into contact with said die assembly and laterally translated upon additional displacement of said cylinder.

8. A reciprocating press for cutting a workpiece placed therein including a reciprocable carriage movable in a longitudinal direction wherein the invention comprises:

a first pair of laterally oriented rails aligned transverse to said longitudinal direction disposed on said carriage and engageable with a second pair of cooperating rails disposed on a lower die shoe of a die assembly permitting translation thereof;

a third pair of laterally oriented rails extending from at least one side of said carriage and alignable with said first pair;

a rod disposed on said press and reciprocable with respect thereto engaging an aperture defined in said carriage for maintaining a first position of said carriage;

a rod disposed on said carriage and reciprocable with respect thereto engaging an aperture defined in said die assembly for maintaining said second position of said die assembly;

a pinion rotatably maintained on said press and drivingly engaging a rack disposed on said die assembly for displacing said die assembly to a first position from a storage position and a fluid actuated cylinder displaceable to cause a cam follower to be displaced along a cam profile upon displacement thereof such that said cam follower is elevated into contact with said die assembly and laterally translated upon additional displacement of said cylinder.

* * * * *